United States Patent

[11] 3,602,703

[72] Inventor Thomas R. Polenz
 Greendale, Wis.
[21] Appl. No. 867,541
[22] Filed Oct. 20, 1969
[45] Patented Aug. 31, 1971
[73] Assignee International Business Machines
 Corporation
 Armonk, N.Y.

[54] POWER DEMAND PREDICTING CONTROL SYSTEM
 11 Claims, 8 Drawing Figs.
[52] U.S. Cl. .................................................... 235/151.21
[51] Int. Cl. .................................................... G05b 13/02,
 G05b 15/02, G06f 15/46
[50] Field of Search ........................................ 235/151.21

[56] References Cited
 OTHER REFERENCES
Tippett, J. et al. CONTROLLING MEGAWATTS IN STEELMAKING, In Control Engineering, p. 68-70, June, 1965, TJ212.C6.

Primary Examiner—Eugene G. Botz
Assistant Examiner—R. Stephen Dildine, Jr.
Attorneys—Hanifin and Jancin and John H. Holcombe ABSTRACT: A power consumption control system and method for controlling total power consumption during a demand billing period of a plurality of variable rate consuming devices which operate in a known pattern. The devices are monitored to determine the stage of operation of the known pattern for each device. The devices are allocated priorities according to predetermined classifications. The total power consumption of the highest priority devices is estimated, based upon the power consumption of the present and immediately following stages of operation thereof and the expected time to be spent in each, for the remainder of the demand billing period, and that amount of power is allocated thereto. The maximum power consumption of the remaining devices over the same period is likewise estimated and the remaining available power is allocated thereto in accordance with the ratio of the available power to the maximum power consumption thereof.

PATENTED AUG 31 1971

INVENTOR.
THOMAS R. POLENZ

BY John H. Holcombe
ATTORNEY

POWER DEMAND PREDICTING CONTROL SYSTEM

BACKGROUND OF THE INVENTION

1. Field of the Invention

This invention relates to power consumption control and, more particularly, to prediction and control of power consumption during a demand billing period.

2. Description of the Prior Art

Electric utility companies normally employ a demand billing technique for the billing of large customers. Under this system, electric utilities typically divide the day into 15 minute demand billing time periods. The billing rates increase substantially if the customer consumes electric power irregularly throughout the day. Hence, it is to the customer's advantage not to use more power during one 15-minute time period than he uses during any other such time period.

Attempts have been made in the past to control electrical power according to a demand billing scheme. Typically, these techniques examine power usage during an immediately preceding short period of time, such as 1 or 2 minutes, and assume that this rate of power use will continue during the remainder of the demand period. Such systems project these values through the remainder of the demand period and control the load in accordance with this projected or anticipated demand. In this manner, these systems calculate the total amount of power that would be used during the remainder of the demand period if the current use continues, and compare this amount to the amount of power available according to the demand limit. If this calculation shows that the limit will be exceeded, some control action is taken to reduce the rate of power consumption. Hence, these systems are concerned primarily with maintaining the load less than the predetermined demand limit and thus do not utilize the maximum available load throughout the demand period. Accordingly, power which might be consumed at a cheaper rate is not consumed since the load anticipation does not contain provision for maintaining the highest possible load factor on the system.

Various improvements have been made to this basic method to some what increase the accuracy thereof. For example, control systems have been arranged to compute the average rate at which power is consumed over progressively smaller subperiods during the demand period. The predicted demand at the end of each subperiod is derived by adding accumulated power already actually consumed to the product of the present computed average rate times the time remaining in the demand period. Thus, a brief duration high or low rate of power consumption may be allowed to average out during the first part of the demand period due to the relatively long subperiods. Still, however, cutbacks in the rate of power consumption made because of power consumption extrapolation may not be recouped later in the demand period when various ones of the power-consuming devices progress to new stages of operation having reduced or no power consumption. Again, efficiency of operation through full utilization of the equipment is not accomplished and power which might be consumed at a cheaper rate is not consumed.

SUMMARY OF THE INVENTION

It is therefore an object of the present invention to allow prediction and control of power consumption of variable-rate consuming devices which maintains the highest possible load factor on the system consistent with a constant consumption on a periodic demand billing basis.

Briefly, the invention comprises a system and method for controlling total power consumption during a demand billing period of a plurality of variable-rate consuming devices which operate in a known pattern. Monitoring means is provided to monitor each of the devices to determine the stage of operation thereof. Priority means allocates priorities between the devices according to a predetermined classification. In response to the outputs of the monitoring means and priority means, an allocation means estimates the amount of power consumption of the highest priority devices during the remainder of the demand billing period and allocates the estimated power thereto. The estimate is based upon the power consumption of the present stage and the next stages and the expected time to be spent in each. Subtracting means subtracts the amount of allocated power from the total amount of power available during the remainder of the demand billing period to thereby determine the amount of remaining available power. In response to the outputs of said monitoring means and said priority means, allocation means similarly estimates the maximum amount of power consumption of the remaining ones of said devices under normal operation during the remainder of said demand billing period, compares the estimated maximum amount of power consumption to the amount of remaining available power determined by the subtracting means to establish a ratio therebetween, and allocates said remaining power to said remaining devices in accordance with said ratio.

DESCRIPTION OF THE PREFERRED EMBODIMENT

As stated above, electric utility companies normally employ a demand billing technique for the billing of large customers. Hence, under this system, it is to the customer's advantage to use the same amount of power during all demand billing periods throughout the working day.

Figure 1:
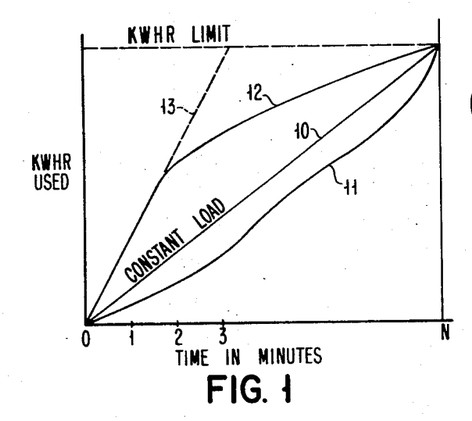
FIG. 1 comprises a graphical illustration of power consumption during a demand period.

FIG. 1 illustrates how kilowatt hour consumption of electricity might vary during a demand period and still result in the same total power consumption during the demand period. The straight line 10 represents a constant load throughout the demand period, curved line 11 represents a load which is initially at a low value and increases toward the end of the demand period, and curved line 12 represents a load which is initially at a high value and declines toward the end of the demand period. A conventional power consumption controller can operate well with the constant load 10 and the load represented by line 11, but would extrapolate the initial load of line 12 in the manner shown by dashed line 13. The conventional controller would thus assume that, without correction, the limit would be reached during the initial part of the demand period. The conventional controller would therefore reduce the initial power consumption rate when the reduction was actually unnecessary. The system of the present invention would, however, predict the change in the process to occur later in the demand period which will cause the total load during the demand period to be less than the initial rate as shown by the subsequent portion of line 12. The system of the present invention therefore would not take control action to reduce consumption unless the limit would still be exceeded.

Figure 2:
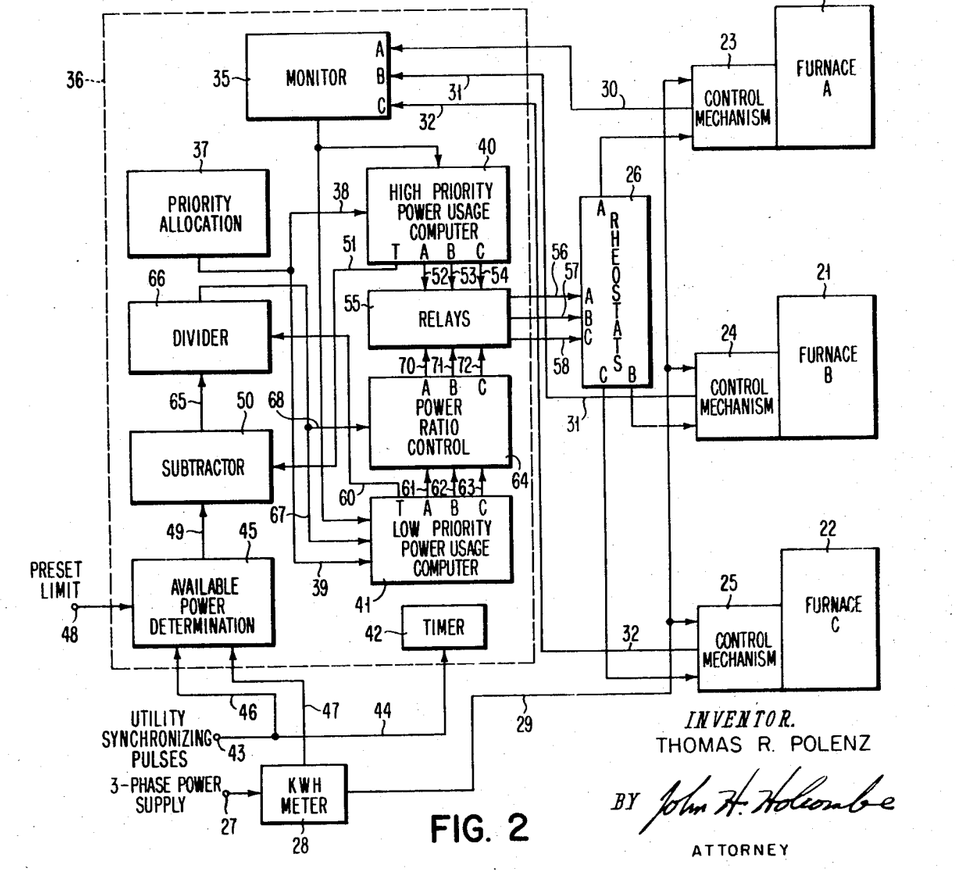
FIG. 2 comprises a diagrammatic illustration of the functions of a power consumption control system for electric arc furnaces employing the present invention.

Referring to FIG. 2, an exemplary power consumption control system is shown employed with three electric arc furnaces 20–22 in a foundry. It is noted that the situation of large varying and controllable powerloads is typical of many industrial plants. Therefore, this control system and method is not limited to foundries and electric arc furnaces, but is equally applicable to induction furnaces, annealing ovens, cathode plating operations and many other types of industrial and electrical loads. Connected to each furnace is a standard control mechanism 23–25. The control mechanism comprises the means to control the furnace operation under the direction of the melting foreman. Connected to each control mechanism is a plurality of rheostats 26. The rheostats may be controlled by the subject control circuitry or may be controlled manually by the melting foreman. These rheostats cause the control mechanism to adjust the spacing of carbon electrodes in the furnace with respect to the surface of the steel, as will be explained hereinafter. Steel in the furnace is melted by striking an arc from the end of a carbon electrode to the surface of the steel. Raising an electrode decreases current and power, and lowering an electrode increases current and power. Each furnace is powered by a large three-phase transformer, the power to which is supplied as a portion of the power from a three-phase power supply input 27 from the electric utility company. This power is supplied to a kilowatt hour meter 28 and then on line 29 to the control mechanism for each furnace.

Steel is made in the furnaces in bathes which are called "heats." A typical 10,000-pound head takes about 90 minutes to completely process through a furnace, comprising six different stages of operation. The stages, activity, typical time and power consumption for each stage, including a seventh stage of furnace shutdown, are shown below.

| Stage | Activity | Typical Time | Power |
|---|---|---|---|
| 7 | Furnace Shutdown |  | Off |
| 6 | Tapping, Patching, Charging | 15 min. | Off |
| 5 | Melt Down, A-Tap | 35 min. | On |
| 4 | Melt Down, B-Tap | 25 min. | On |
| 3 | Oxygen Blow | 3 min. | Off |
| 2 | Heating, C-Tap | 10 min. | On |
| 1 | Alloys Added, C-Tap | 2 min. | On |

The "A-Tap" refers to the 230-volt tap from the power transformer for a particular furnace, "B-Tap" refers to the 180-volt tap from the transformer, and the "C-Tape" refers to the 110-volt tap therefrom.

Briefly, tapping the previous head is the signal to start a new head. A head is begun by the charging of the furnace with the material to be melted, and is shown as stage 6. Upon charging, turning the power on changes the status to stage 5 and an arc is formed between the electrodes and the steel with the power supplied from the A-Tap of the power transformer, thereby melting the steel. A subsequent switch to the B-Tap of the power transformer changes the heat to stage 4 as the melting continues. Then the power is turned off and an oxygen blow occurs, comprising stage 3. Restarting the arc from the C-Tap then comprises stage 2 and the subsequent addition of alloys comprises stage 1. At this time, the furnace returns to stage 6 and the heat is tapped.

The control mechanism 23–25 for each furnace includes a kilowatt hour meter for supplying signals on cables 30–32. These signals are applied to the monitor 35 of the subject power consumption control system 36. The monitor includes circuitry for accumulating the signals during a heat for each furnace and comparing the accumulated number to preset numbers to thereby determine the stage of operation of the furnace. The accumulation is reset to zero upon the corresponding furnace beginning a new heat.

The priorities of the furnace are determined by the melting foreman by means of a rotary switch which he manually sets to establish the priority allocation in circuitry 37. The switch thus indicates which of the three furnaces 20–22 has the highest priority. The priority is determined by the melting foreman on the basis that the next furnace to be tapped is given the highest priority. The priority allocation might also be done automatically by merely detecting that furnace which is in the lowest numbered stage. The output of the priority allocation circuitry appears on lines 38 and 39 to high-priority power usage computer 40 and low-priority power usage computer 41. This output comprises signals indicating the one of the three furnaces which has been allocated the high priority.

The operation of the circuitry comprising power control system 36 is accomplished under the control of timer 42. The timer is responsive to utility synchronizing pulses supplied from input 43 on line 44. The synchronizing pulses are supplied from the utility company at predetermined intervals, such as 15 minutes, to indicate thereby the termination of one demand billing period and the beginning of the next. The timer 42 comprises an interval timer which transmits a signal to initiate operation of the power consumption control circuitry upon receipt of the utility synchronizing pulse and also subsequently supplies the signal 14 times at 1-minute intervals. The signal from timer 42 is supplied to monitor 35 and available power determination circuitry 45, to initiate operation of the power consumption control circuitry 36. The signal from timer 42 causes the comparison circuitry of monitor 35 to operate and supply the stage of operation of each furnace to computers 40 and 41.

Available power determination circuitry 45 contains a counter which is reset to zero upon the occurrence of a utility synchronizing pulse from input 43 transmitted thereto on line 46. The counter is incremented by pulses on line 47 from kilowatt hour meter 28. Each pulse so supplied represents a specific increment of power usage such as 22 kw. hr. Thus, the count present in the counter represents the total amount of power utilized to that time during the demand billing period. Circuitry 45 also includes a register which is preset to the total amount of power which is to be utilized during the demand billing period. The designation of this amount is supplied at input 48 and is normally constant. The last circuit comprising the available power determination circuitry 45 is a subtractor which operates upon occurrence of the signal from timer 42 to subtract the count in the counter representing the power usage up to that time from the contents of the register which indicates the total amount of power to be used during the demand period. The output of the subtractor represents the total power available to the furnaces for the remainder of the demand period and is supplied on output cable 49 to another subtraction circuit 50.

At the same time, priority allocation circuitry 37 supplies the signals representing the highest priority furnace to computers 40 and 41 over lines 38 and 39. Computer 40 responds thereto by gating data from monitor 35 giving the stage of operation of the high-priority furnace. This data is used to check against data in registers in computer 40 which also indicates the stage of operation and the time remaining in that stage until the stage is estimated to be completed. The stage number is translated by internal circuitry to a power consumption rate and a time for operation at that stage. Computer 40 includes a subtractor for subtracting the time in the present stage for the furnace from the time for the stage to thereby indicate the time remaining in the present stage. This time is then compared by a logic circuit to the time remaining in the demand period, which is obtained from the timer 42. If the comparison shows that the time remaining in the present stage is equal to or greater than the time remaining in the demand period, this indicates that the furnace will remain in the same stage during the entire remaining time of the demand period. However, if the comparison shows that the time remaining in the present stage is less than the time remaining in the demand period, it indicates that the furnace will change from one stage to the next during the remainder of the demand billing period.

The computer 40 also includes means for multiplying, which may comprise either an electronic multiplier or an adder and means for repetitive adding so as to accomplish the same result as multiplication.

If the output of the logic circuit indicates that the furnace will remain in the same stage for the remainder of the demand period, the multiplying means operates to multiply the time remaining in the demand period by the power consumption rate of the present stage and supply the product at output T on cable 51.

However, if the output of the logic circuit indicates that the furnace will go on to the next stage during the demand period, computing circuitry 40 operates another multiplier to multiply the time remaining in the present stage by the power consumption rate of the present stage and to store that first partial product in a register included in circuitry 40. Next, the circuitry operates a subtraction circuit to subtract the time remaining in the preset stage from the time remaining in the demand billing period. These are the same amounts that were compared by the logic circuit, above.

Referring to the table of stages, above, it is possible for the furnace to operate in three stages during a single demand billing period. Therefore, another comparison is made by another logic circuit in the computer 40. In this instance, the amount of time required for the next stage is compared by that logic circuit to the time remaining in the demand billing period after completion of the present stage, which is the result of the above subtraction.

If the comparison shows that the time for the next stage is equal to or greater than the subtracted time left in the demand period, this indicates that the furnace will operate only in the present and next stage during the remainder of the demand billing period. Therefore, another multiplier in circuitry 40 is employed to multiply the subtracted time left in the demand period by the power consumption rate of the next stage. This product is then supplied to an adder and added to the stored first partial product and the total supplied at output T on cable 51.

However, if the output of the logic circuit shows that the time for the next stage is less than the subtracted time left in the demand period, this indicates that the furnace will operate in the present, next and a third stage during the remainder of the demand billing period. Therefore, another multiplier of circuitry 40 is employed to multiply the time of the next stage by the power consumption rate of that stage to form a second partial product which is stored in a register included in circuitry 40. Next, the time of the next stage is supplied to another subtraction circuit of computer 40 and subtracted from the subtracted time left in the demand period to form a remainder. The remainder is supplied to another multiplier and multiplied by the power consumption rate for the third stage. This product is then supplied to a three-way adder and added to the first partial product and the sum added to the second partial product. The resultant sum is then supplied at output T on cable 51.

High-priority power usage estimation circuitry 40 also operates to respond to the priority allocation signal on line 38 by supplying a signal on one of the lines 52-54 to a bank of relays 55. The output terminals of circuitry 40 to which lines 52-54 are connected are labeled respectively A, B and C. The line at which the signal appears indicates that that furnace is the highest priority furnace. The relays of the bank of relays 55 operated by that signal respond, as will be explained hereinafter, by supplying signals on the set of lines 56-58 to thereby operate the rheostats associated with the highest priority furnace. The operated rheostats thus, in turn, cause the associated control mechanism 23-25 to operate the associated furnace 20-22 at maximum required power.

Low priority power usage estimation circuitry 41 is identical to the circuitry 40 except that it is arranged to respond to the output of the priority allocation circuitry 37 on line 39 by estimating the power consumption for the furnaces other than high-priority furnace, and except that it includes an additional register for storing the calculation for one furnace while estimating the power usage for the other furnace. The estimated power consumption for the two furnaces are then added and the resultant total supplied at output terminal T on cable 60. At the same time, circuitry 41 responds to the priority indication on line 39 by supplying a signal on each of the three lines 61-63 to power ratio control 64. Output lines 61-63 are connected to output terminals labeled A, B and C of circuitry 41 and indicate the two furnaces that are not of the highest priority.

As mentioned above, the number indicating the amount of available power for the furnaces for the remainder of the demand period is supplied on cable 49 to subtractor 50. Also as discussed above, the estimated power consumption for the high-priority furnace is supplied on cable 51 to the subtractor 50. The subtractor operates to subtract the number appearing on cable 51 from the number appearing on cable 49 and supply the net result on cable 65. The effect of this subtraction is to subtract the estimated high-priority usage from the available power for the furnaces for the remainder of the demand billing period. The net result appearing on cable 65 is the remaining power available for the low-priority furnaces.

As additionally discussed above, the number supplied on cable 60 represents the estimated power usage of the low-priority furnaces if operated at maximum power. This output and the output of subtractor 50 are supplied to division circuit 66. The division circuit operates to divide the number on cable 65 by the number on cable 60 and provide the resultant quotient on cables 67 and 68 to low-priority power usage estimation circuitry 41 and to power ratio control circuitry 64. This output quotient represents the ratio of the available power for the low-priority furnaces to the power usage by those furnaces if they were allowed to operate at 100 percent of power.

The signals on line 68 to power ratio control circuitry 64 operate logic circuitry therein in accordance with the ratio designated by the output signals to supply a signal on one of 11 lines. The 11 lines designate ratios at 10 percent intervals from 0 percent to 100 percent. These lines are each connected to three AND circuits, each representing a furnace, of a matrix of 33 circuits. The other input to each of the AND circuits is one of the lines 61-63. Thus, only two of the 33 AND circuits are operated by a conjunction of inputs, representing the ratio of power to be supplied to the two low-priority furnaces. The output of each AND circuit is connected to one of 33 output lines. These lines are grouped in cables designated 70-72. The signals are thus provided on the two lines of the same percentage in the cables 70-72 representing the two low-priority furnaces. The signals are supplied to relays 55 which transmit corresponding signals on cables 56-58 to rheostats 26. The rheostats thus operate to insert a resistance in the line to the control mechanism 23-25 for the corresponding furnace, which operates as a potentiometer or voltage divider indicating the percentage of power to be supplied to the corresponding furnace 20-22. This proportion will be the maximum required amount for the highest priority furnace and a percentage of the required amount for the low-priority furnaces which is designated by the output of division circuitry 66.

Still referring to FIG. 2, after the operation of the control mechanism 23-25, low-priority power usage estimation circuitry 41 employs the output of divider 66 on lines 67 by directly adding that ratio to the previous time in stage for each low-priority furnace and stores the total in the register representing time in stage for that low-priority furnace. This ratio thus represents the portion of a minute to be credited to the furnace for its operation at the low power operation thereof. The circuitry 40 similarly adds 1 minute to the time in stage for the high-priority furnace. It is of note that the time in stage stored in the circuitry 40 or 41 is only an estimate and that the control mechanism 23-25 conducts the actual operation of the furnace to change from one stage to another. Thus, the output of the monitor 35 overrides the estimates in circuitry 40 or 41.

Figure 3:
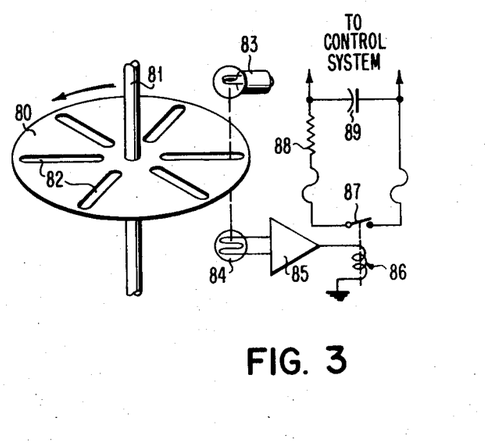
FIG. 3 comprises an illustration of the kilowatt hour meter of FIG. 2.

The kilowatt hour meter 28 of FIG. 2 is shown in detail in FIG. 3. The kilowatt hour meter is primarily a standard device as supplied by the utility company. It includes a disk 80 mounted on a shaft 81. The shaft and disk rotate in accordance with the amount of power being transmitted through the meter. The disk 80 includes a plurality of slots 82. Associated with the disk is a light source 83 and a photodetector 84. The light emitted from light source 83 is shielded from the photocell 84 and impinges thereon only as a slot 82 moves directly between the light source and photodetector. The photodetector thus produces a pulse of electrical energy each time a slot 82 is rotated between it and the light source 83. The pulses produced by the photodetector are supplied to an amplifier 85. The amplifier amplifies the signal and supplies it to reed relay 86. As each electrical pulse is supplied from the amplifier 85, the switch contacts 87 of the reed relay 86 are closed. A filter comprising a resistor 88 and capacitor 89 serve to filter out any contact bounce and allow the contact closing to be detected on lines 47 of FIG. 2 by the counter of circuitry 45. The entire meter with the exception of the filter 88, 89 is supplied by the meter manufacturer. The filter is added only to prevent the counter in circuitry 45 of FIG. 2 from counting the contact bounces and thereby allows it to count only the generated pulses.

Figure 4:
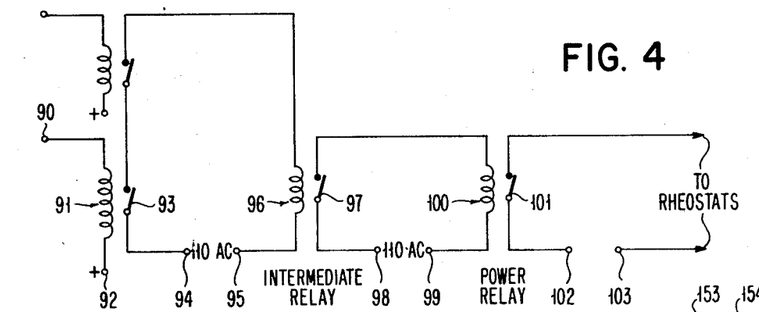
FIG. 4 comprises a diagrammatic illustration of the relays of FIG. 2.

FIG. 4 illustrates one set of relays from the grouping of relays 55 in FIG. 2. Specifically, the lines 52-54 and the lines comprising cables 70-72 are connected to specific ones of 11 sets of these relays for each furnace. The lines 52-54 are each connected to the corresponding 100 percent proportion relay, as is the 100 percent line of each of the cables 70-72 to form an OR function. The remaining relays are connected to the corresponding wires of cables 70-72. The connection is made at input terminal 90. The input is connected to a reed relay 91 and it in turn is connected to a positive power supply 92. Operation of the corresponding line thus causes the signal to be transmitted to the reed relay 91, thus closing the corresponding contacts 93. Closing these contacts connects an AC power supply at terminals 94 and 95 to intermediate relay 96. The intermediate relay is operated thereby to close the corresponding contacts 97. Similarly, closing the contacts 97 connects the power supply at terminals 98 and 99 to power relay 100. Operation of the power relay causes closing of the corresponding contacts 101 and thereby connects another power supply at terminals 102 and 103 to the rheostat 26 of FIG. 2.

Figure 5:
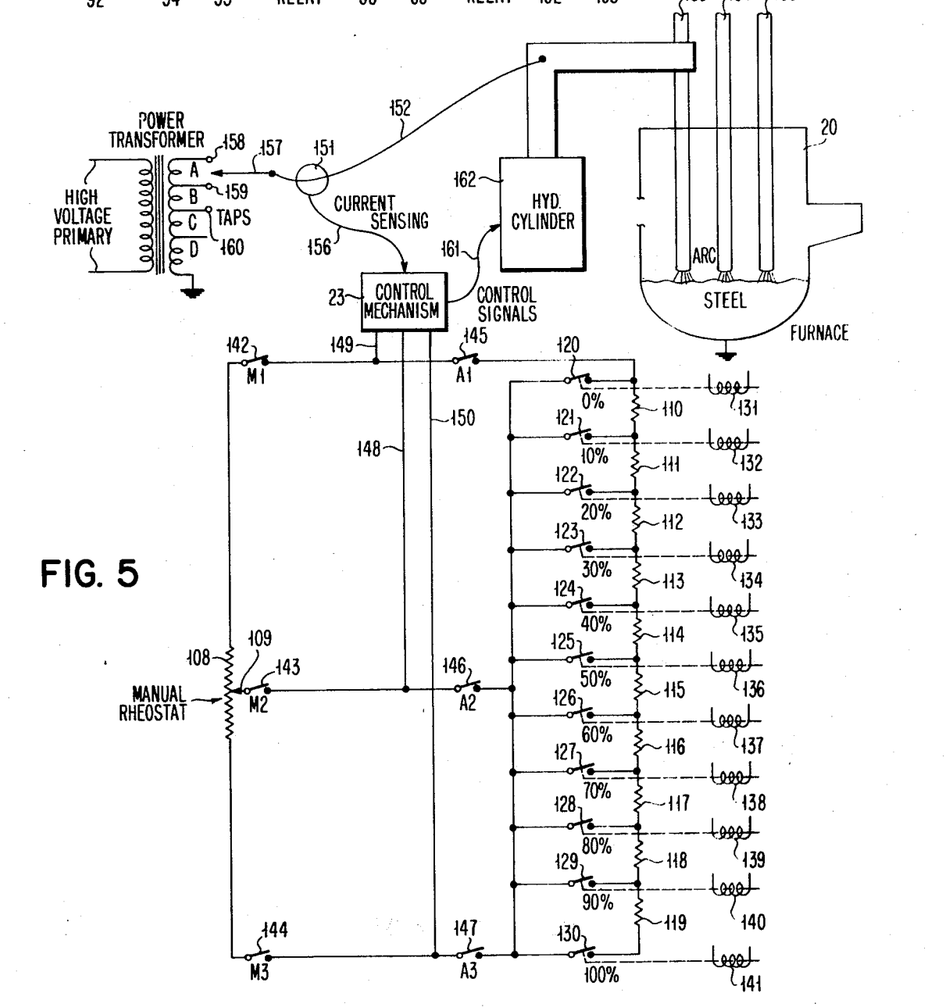
FIG. 5 comprises a diagrammatic illustration of a rheostat, control mechanism and furnace of FIG. 2.

FIG. 5 illustrates the rheostats 26 for one of the furnaces, the power circuit for the electrode one phase of that furnace and the control mechanism for that furnace. For the purpose of illustration, furnace 20 and control mechanism 23 are illustrated.

The rheostat arrangement for each furnace comprises two linear rheostats, a manual rheostat comprising resistance 108 and wiper 109 and an automatic rheostat comprising equal resistances 110-119 and relay contacts 120-130 of relays 131-141. Each of these relays is connected to a power relay 100 of FIG. 4 as contained in the set of relays 55 of FIG. 2.

Switching between the manual rheostat and the automatic rheostat is accomplished by a switch which operates contacts 142-147. In the manual position contacts 142-144 are closed and contacts 145-147 are open. In the automatic position contacts 145-147 are closed and contacts 142-144 are open.

In the manual position, wiper 109 may be manually positioned so as to operate the typical control mechanism 23. The voltage supply to the rheostat is supplied between terminals 150 and 149 by the control mechanism. The net voltage appearing between lines 148 and 149 is the inverse of the resistance and controls the operation of the control mechanism. This much of the rheostat arrangement is conventional. Other, corresponding arrangements may be employed to operate other control mechanisms.

In the automatic position, the voltage presented to the control mechanism 23 is determined by the one of the sets of contacts 120-130 which is closed by the associated relay 131-141. The one of the sets of contacts which is closed causes the rheostat to present the portion of the voltage from terminals 149 and 150 represented by the relay at lines 148 and 149. This proportional voltage at lines 148 and 149 thereby operates the control mechanism 23.

The typical control mechanism 23 includes a current-sensing means 151 arranged to sense the current in the powerline 152 supplying each of the carbon electrodes 153-155 of the electric furnace 20 from powerlines 29. For the sake of illustration, only one of the three powerlines for the three carbon electrodes will be shown.

The power line 152 is connected to a power switch 157 which is controlled by control mechanism 23 to alternatively switch the powerline between transformer taps 158, 159 and 160. As previously discussed, these taps are called, respectively, A-Tap, B-Tap and C-Tap, A-Tap having the highest voltage and C-Tap the lowest. Based upon whether the powerline is connected to taps 158, 159 or 160, the control mechanism 23 responds to the current sensed by current-sensing means 151, the amount of which is supplied on line 156, to thereby transmit control signals on line 160 to hydraulic mechanism 161. The signals on line 160 cause the hydraulic mechanism to thereby raise or lower the corresponding electrode 153 to change the distance between the tip of the electrode and the steel and thus change the current and power of the arc struck by the electrode. The electrode is moved until the current sensed by the current-sensing means 151 indicates to the control mechanism 23 that the proper power is being utilized by the electrode in accordance with the setting of the manual rheostat 108, 109 or the automatic rheostat 110-141.

Figure 6:
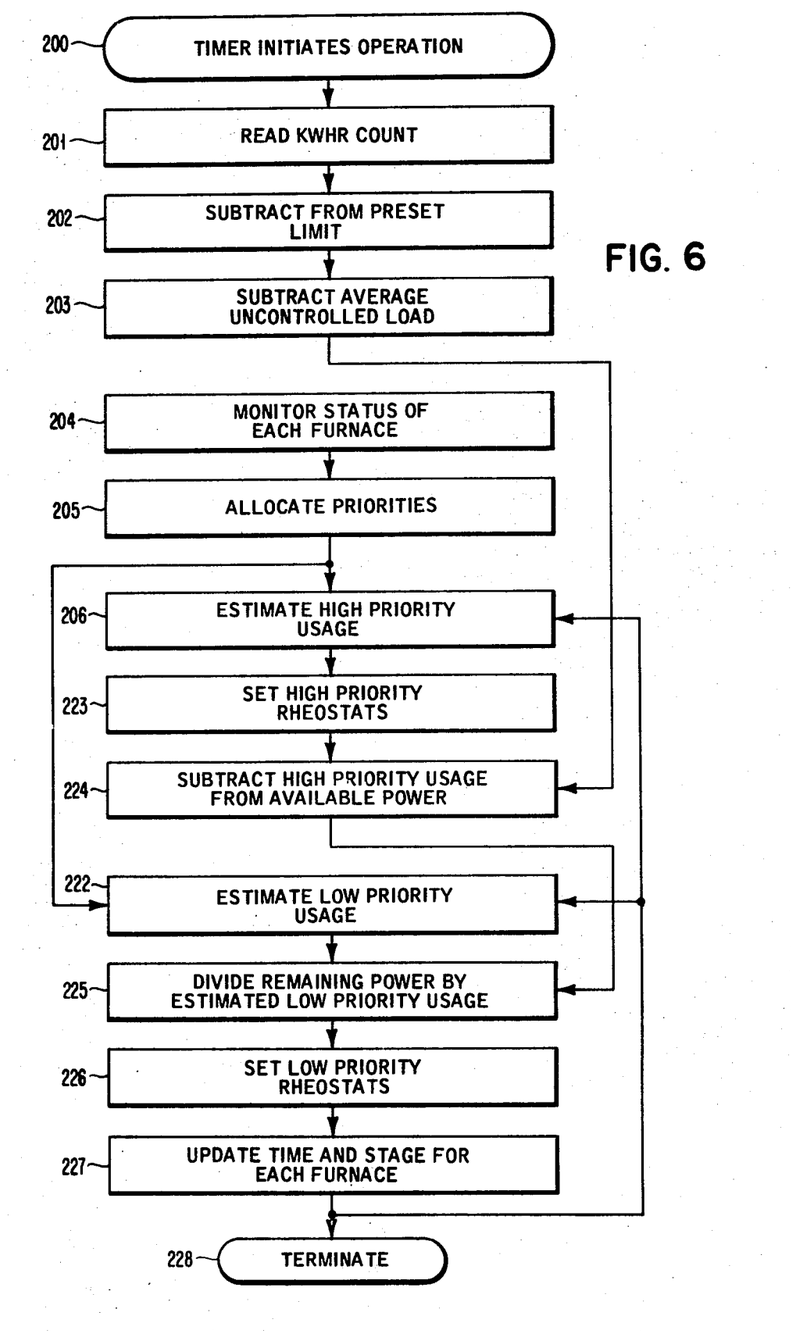
FIGS. 6 and 7 comprise an outline of the steps present in the method of practicing the present invention.
Figure 7:
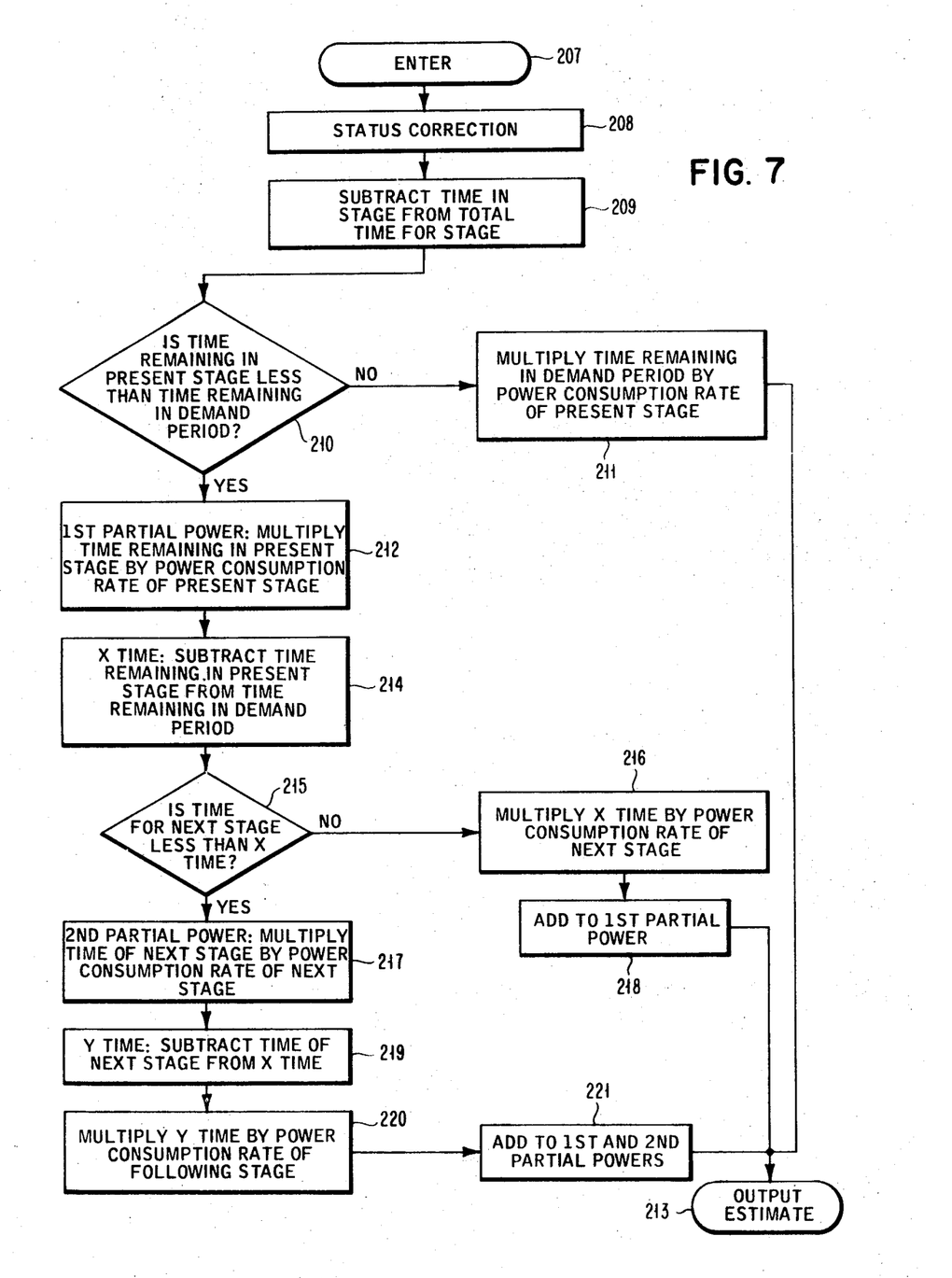

The embodiment of the invention shown in FIG. 2 operates quite effectively to control the power consumption of the three furnaces 20-22 to obtain constant power utilization for each power demand. However, that embodiment comprising control circuitry 36 employs a plurality of adding circuits, subtracting circuits and multiplying circuits. From a cost of the machine standpoint, it would be much more efficient to employ a single adder/subtractor and a single multiple/driver which would be shared by the various functions accomplished by the embodiment of FIG. 2. Such a machine would, of course, comprise a general purpose digital computer. One example of such a computer is the IBM 1800 machine. For the purpose of allowing one having ordinary programming skills to program a general purpose digital computer such as the IBM 1800 to accomplish the method of the present invention, a flow diagram describing the method of the present invention is illustrated in FIGS. 6 and 7. The specific method of accomplishing the implementation of the present invention is defined thereby with additional reference to the following publications:

IBM 1800 Time-Sharing Executive Systems Specification Manual, Form No. C26-590-0, 1964;

IBM 1800 Fortran Language Manual, Form No. C26-5905-3, 1964; and

IBM 1800 Assembly Language Manual, Form No. C26-5882-1, 1964.

These publications are available from IBM Data Processing Division, 180 East Post Road, White Plains, New York 10601.

Referring to FIG. 6, the operation of the program is initiated by an interval timer or utility synchronizing pulse, discussed with respect to FIG 2. This is illustrated as block 200 in FIG. 6. The IBM 1800, discussed above, includes an interval timer which may be synchronized by the utility synchronizing pulses from input 43 in FIG. 2. The interval timer, as discussed in the above manuals, can then be set to initiate the program at 1 - minute intervals.

The program then proceeds to block 201 which instructs the IBM 1800 to read the kilowatt hour count for the overall plant operation. As discussed in the above manuals, certain inputs of the IBM 1800 may be connected to kilowatt hour meters to continuously count the pulse train output of the kilowatt hour meters. The machine may then be instructed to read the kilowatt hour count at specified points in the program. The accumulated count is automatically reset to zero by a program interrupt upon the occurrence of a utility synchronizing pulse.

The next step in the program is represented by block 202 and comprises an instruction to subtract the total amount of power consumption this far in the demand billing period as obtained from the kilowatt hour count in step 201 from a preset limit of power consumption for the demand billing period. In the next step 203, the computer is instructed to subtract the average uncontrolled load, which is an estimate of the amount of power to be utilized during the remainder of the demand period by the uncontrolled load, from the result of step 202. The uncontrolled load concerned here comprises the load on the power supply from the utility company which comprises all other operations than the power employed by the furnaces 20–22. This power includes such things as power to run the computer, lights and air conditioning for the building, operation of other machinery, etc. The uncontrolled power consumption generally varies only slightly throughout the day and, hence, the average thereof may be employed as an accurate estimate of future usage. If this amount of power does not vary from day to day, a preset standard factor may be employed by the computer for subtraction. Otherwise, the computer may make averaging calculations at various times.

Shown next is step 204 which comprises monitoring the status of each furnace. Specifically, the IBM 1800 maintains the count of the pulse train outputs from the kilowatt hour meters of the furnaces as discussed above. The accumulated count for a furnace is automatically reset to zero by a program interrupt as the furnace begins a new heat. Step 204 comprises instructions to read the accumulated kilowatt hour count for each of the furnaces, compare each count to preset numbers to determine the stage of operation of each furnace and store the indication thereof.

In step 205, the computer allocates priorities to the furnaces based upon a manual input from the melting foreman. This input may comprise the position of a manual switch supplied to one of the inputs of the IBM 1800 computer.

Based upon the priority allocation, the computer proceeds to step 206 to estimate the power consumption for the remainder of the demand billing period for the high-priority furnace. Block 206 comprises a plurality of steps which are illustrated in more detail in FIG. 7.

The entry from step 205 to step 206 is shown by the "enter" block 207 of FIG. 7. In step 208, the computer compares the updated storage stage of operation for the instant furnace, as will be explained hereinafter, with the stage of operation therefore detected by step 204 of FIG. 6. If the stages are not the same, the output of step 204 is substituted for that obtained by the updating process.

Proceeding to step 209, the computer then subtracts the updated time in stage from the estimated total time for that stage, the estimate having been kept in storage. The output from step 209 comprises the estimated remaining time in the present stage of operation of the furnace.

In step 210, the estimated time remaining in the present stage is compared to the time remaining in the demand period. If the result of this comparison shows the time remaining in the present stage to be equal to or greater than the time remaining in the demand period, it indicates that the present stage of operation of the furnace will occupy the entire remaining time of the demand period. Therefore, the computer proceeds to step 211. If, however, the result of the comparison shows it to be less, this indicates that the furnace will enter a new stage during the remainder of the demand billing period. In this case, the computer transfers to step 212.

In step 211, the remaining time in the demand billing period is multiplied by the stored power consumption rate of the present stage of the furnace. The product represents the estimate of the power consumption of the high-priority furnace for the remainder of the demand billing period. In step 213, this estimate is supplied as the output for step 206 of FIG. 6.

Step 212 comprises multiplication of the remaining time in the present stage by the power consumption rate of the present stage. This product comprises the estimated power consumption of the high-priority furnace for the completion of the present stage, which amount is called the "1st partial power" and is temporarily stored. The computer proceeds to step 214 wherein the inputs to step 210 are again employed. The time remaining in the present stage determined in step 209 is subtracted from the time remaining in the demand billing period. The result of the subtraction is called "X time" and represents the time remaining in the demand billing period after completion of the present stage.

In step 215, the time for the next stage is compared to the X time. If the result of this comparison shows the time for the next stage to be equal to or greater than the X time, it indicates that the next stage of operation of the furnace will occupy the entire final part of the demand period. Therefore, the computer proceeds to step 216. If, however, the result of the comparison shows it to be less, this indicates that the furnace will enter a third stage during the final part of the demand period. In this case, the computer transfers to step 217.

In step 216, the time remaining in the demand billing period after completion of the present stage, this number comprising the X time which is the result of the subtraction in step 214, is multiplied by the power consumption rate of the next stage of the high-priority furnace. This product and the 1st partial power product stored from step 212 are then added in step 218. This total therefore comprises the total estimated power consumption of the high-priority furnace during the remainder of the demand billing period. This total is then supplied as the output estimate in step 213 for the estimate of the high-priority power usage in step 206 of FIG. 6.

Step 217 comprises multiplication of the total time for the next stage by the power consumption rate of that stage. This product comprises the estimated power consumption for that stage of the furnace and is called the "2nd partial power." The computer then proceeds to step 219 and again employs the inputs to step 215, subtracting the time of the next stage from X time. The result of this subtraction is called "Y time" and represents the time remaining in the final part of the demand billing period after completion of the next stage. The next step 220 comprises the multiplication of Y time by the power consumption rate of the third stage of the demand period. This product and the 1st and 2nd partial powers are then added in step 221. This total represents the total estimated power consumption of the furnace during the entire remainder of the demand billing period. This total is then supplied as the output in step 213 for the estimate of the high-priority power usage in step 206 of FIG. 6.

As is discussed in the above manuals, the IBM 1800 computer has the capability of conducting and accomplishing several steps nearly simultaneously. Therefore, at the same time that the computer is conducting step 206 in FIG. 6, it is similarly conducting step 222. Step 222 comprises the estimate of the power consumption of the low-priority furnaces. The steps and procedures for making these estimates are identical to those of step 206 and are the same as illustrated in FIG. 7 and previously discussed.

At this time, the computer sets the rheostats 26 of FIG. 2 for the high-priority furnace. The IBM 1800 computer is equipped with digital outputs which are capable of supplying sufficient power to operate the relays to control the associated control mechanism 23–25. The setting of the rheostats for the high-priority furnace is shown as step 223 in FIG. 6. The computer then proceeds to step 224 and subtracts the output estimate from step 213 in FIG. 7 of the power consumption for the high-priority furnace from the available power as obtained from step 203 in FIG. 6. The result of this subtraction is the estimated amount of remaining power available for the low-priority furnaces. Proceeding to step 225, the remaining power obtained as the output of step 224 is divided by the estimated usage of the low-priority furnaces from step 222. The result of this step comprises the ratio of available power to the maximum power which would be used by the low-priority furnaces. In step 226, the computer operates the relays 26 of FIG. 2 to thereby set the rheostats in accordance with that ratio as discussed with respect to the embodiment of FIG. 2.

In step 227, the computer updates the time in stage for each furnace. For the high-priority furnace, this means adding 1 minute to the stored time in stage, and for the low-priority furnaces the ratio obtained from step 225 is directly added to the time in stage stored therefor.

If at this time the time in stage becomes equal to that of the stored total time for that stage, the computer moves to the next stage of furnace operation and addresses the estimated total time for that next stage for utilization by step 208 in FIG. 7. The computer then proceeds to step 228 and terminates the program. The program will then be initiated again by the interval timer as shown by step 200.

It is therefore apparent that the system and method of the present invention may be implemented either directly in controlling hardware as shown in FIG. 2 or may be implemented by programming a general-purpose digital computer such as the IBM 1800. This system and method therefore accomplishes the true prediction of power consumption for the furnaces for a demand billing period, employing the stage of operation of each furnace and including in the estimate any changes in states that may occur during the demand billing period. The system and method therefore avoids employing merely extrapolations of prior power consumption and more accurately assures that the precise amount of power allocated for each demand billing period will be exactly consumed.

Figure 8:
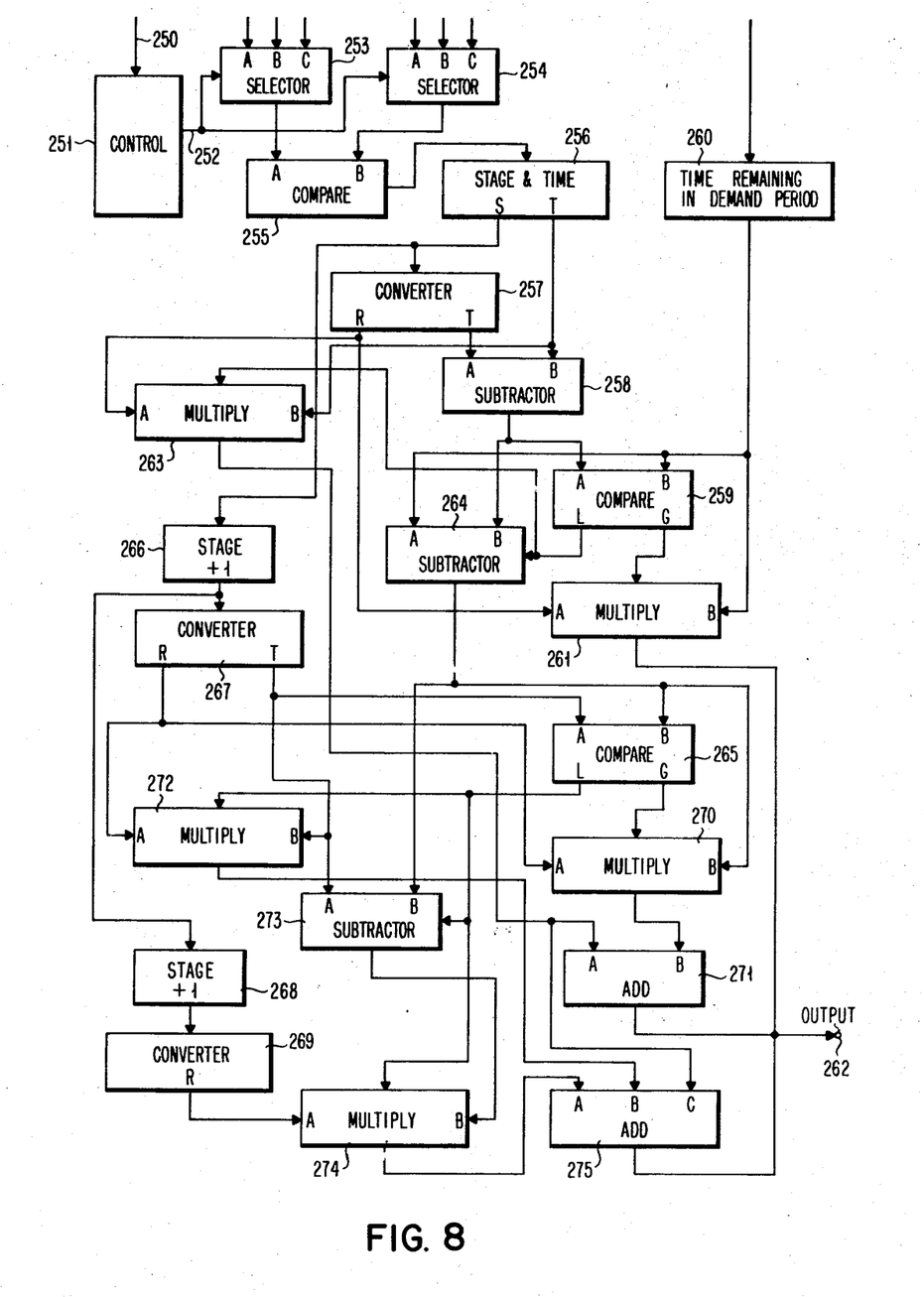
FIG. 8 comprises a diagrammatic illustration of computers 40 and 41 of FIG. 2.

For the purpose of illustration, an example of the circuitry comprising either high-priority power usage computer 40 or low-priority power usage computer 41 is shown in FIG. 8.

Briefly, the signals representing the highest priority furnace are supplied on line 250 to control 251. Line 250 comprises line 38 for computer 40 or line 39 for computer 41. In computer 40, the control decodes the designation of the highest priority furnace and transmits a signal on the corresponding one of the three outputs comprising cable 252 to selectors 253 and 254. The three outputs also comprise outputs 52-54 of FIG. 2. In computer 41, the control 251 decodes the designation of the highest priority furnace and transmits signals on the two of the three outputs not corresponding thereto. Selectors 253 and 254 respond to the control signal by gating the inputs A, B or C to compare circuit 255. Selector 253 is connected to the outputs of monitor 35 for the three furnaces and selector 254 is connected to registers which store the updated stage and time for the three furnaces. Compare circuitry 255 tests for equality of the two stage designations for the furnace selected by the two selectors. If the test shows equality, the output of selector 254 is gated to stage and time storage register 256. If, however, the stage designation from selector 253 is greater than that from selector 254, the stage output of selector 253 is gated to register 256 and the time of zero transmitted thereto. If the test shows the stage designation of selector 253 to be less than that from selector 254, then the stage output of selector 253 is gated to register 256 and no time designation transmitted so as to allow the register 256 to retain the prior time designation. In this manner, that status of the furnace is checked for accuracy with the monitor and corrected if necessary.

The stage output of register 256 is supplied to converter 257 which translates the stage designation by gating a preset output selected thereby. The preset output comprises a designation of the power consumption rate for that stage at output R and a designation of the time required for that stage at output T. The time for the stage is thus supplied to one input of subtractor 258 and the time spent in that stage is supplied from register 256 to the other input of the subtractor. The subtractor subtracts input B from input A and the output designates the time remaining in the present stage and is supplied to the A input of logic circuit 259. The time remaining in the demand period is supplied from timer 42 of FIG. 2 and temporarily stored in register 260. This time is supplied to the B input of logic circuit 259 and compared to the A input. If the A input is less, the logic circuit supplies a signal at output L. If the A input is equal to or greater than the B input, a signal is supplied at output G.

The signal at output G operates multiplier 261 to multiply the power consumption rate for the present stage from output R of converter 257 by the time remaining in the demand period from register 260. The resultant product is supplied to output terminal 262 which corresponds to output T from computers 40 or 41.

A signal from output L of logic circuit 259 operates multiplier 263 and subtractor 64. Multiplier 263 multiplies the power consumption rate of the present stage from converter 257 by the time remaining in the present stage from register 256. Subtractor 264 subtracts the time remaining in the present stage as supplied by subtractor 258 from the time remaining in the demand period supplied by register 260 and supplies the result to the B input of logic circuit 265.

At the same time, the stage output of register 256 is supplied to incrementing circuit 266. Circuit 266 adds "1" to the received stage designation and supplies the resultant designation of the next stage to converter 267 and to incrementing circuit 268. Circuit 268 operates similarly to thereby designate the following stage to converter 269.

Converter 267 supplies the time for the next stage to the A input of logic circuit 265. The logic circuit operates identically to circuit 259. Thus, if the A and B inputs are equal or the A input is greater, a signal is supplied at output G to operate multiplier 270. The multiplier multiplies the power consumption rate for the next stage from converter 267 by the time left in the demand period after the present stage supplied from subtractor 264. The product is supplied to adder 271 and added to the power consumption of the present stage supplied from multiplier 263. The resultant total power consumption is supplied to output 262.

If input A to compare circuit 265 was less than the B input, a signal is supplied at output L thereby to operate multiplier 272, subtractor 273 and multiplier 274. Multiplier 272 multiplies the power consumption rate of the next stage by the time for that stage, both supplied by converter 267. The resultant product is supplied to the B input of adder 275. Subtractor 273 subtracts that time of the next stage at input A from the time remaining in the demand period after completion of the present stage as supplied by subtractor 264. The resultant time left for the third stage is then supplied to multiplier 274 for multiplication by the power consumption rate for that stage as designated by converter 269. The resultant power consumption is supplied to input A of adder 275. Input C to the adder comprises the power consumption of the present stage from multiplier 263. The three power consumption amounts are added by circuit 275 and supplied to output 262.

While the invention has been particularly shown and described with reference to preferred embodiments thereof, it will be understood by those skilled in the art that various changes in form and details may be made therein without departing from the spirit and scope of the invention.

What is claimed is:

1. Apparatus for controlling total power consumption during a demand billing period of a plurality of controllable variable-rate power-consuming devices which operate in a known pattern, said devices including control means operable to separately control the power consumption rate of each said device and thereby stretch or shorten said pattern therefor, and wherein metering means supplies signals indicative of the power consumption of said devices comprising:

available power computer means responsive to said signals from said metering means and to a preset limit, which limit indicates the desired limit of power consumption during said demand billing period, for periodically computing the amount of remaining power available for consumption by said devices during the remainder of said demand billing period;

priority means for periodically allocating priorities between said devices in accordance with a predetermined classification;

first power usage computer means responsive to said priority means for determining the point in said pattern of said devices having the highest priority allocated thereto and responsive to said determination to estimate the power consumption thereof as defined by said pattern for the remainder of the demand billing period, and for signalling said control means therefor to operate said associated device at the maximum available power consumption rate in accordance with said pattern, subtraction means responsive to said first power usage computer means and said available power computer means for subtracting the value of said estimated power consumption from the value of said remaining available power to thereby determine the amount of power available for the remaining ones of said devices; and Second power usage computer means responsive to said priority means for determining the point in said pattern of each of said devices not having the highest priority allocated thereto and responsive to said determination to estimate the maximum amount of power consumption thereof as defined by said pattern for the remainder of the demand billing period, additionally responsive to said amount of power available for said remaining devices and to said estimated maximum amount of power consumption thereby to establish a ratio therebetween, and for signalling said control means therefor to operate said associated device at a power consumption rate in accordance with said ratio as related to the maximum rate of said pattern.

2. The apparatus in accordance with claim 1 wherein:
said first power usage computer usage computer means includes means responsive to the occurrence of said signalling of said control means thereby for updating said point determining means determination therein for each said remaining device in accordance with said pattern at the power consumption rate in accordance with said ratio.

3. The apparatus in accordance with claim 2 wherein:
said first and second power usage computer means each include means to estimate said power consumption of each said associated device by employing the updated point in said pattern for estimating the power consumption rates and time to be spent at each such rate for each said device during the remainder of said demand billing period and employing said estimated rates and times to estimate the maximum total power consumption of said associated devices during the remainder of the demand billing period.

4. The apparatus in accordance with claim 3 wherein:
said power consumption estimation means in said power usage computer means includes multiplication means for multiplying the value of each said power consumption rate for each associated device by the value of said time to be spent thereby at such rate during the remainder of said demand billing period and adding means to add the products of said multiplication.

5. The apparatus in accordance with claim 4 additionally including:
timing means responsive to a synchronizing signal supplied from a synchronizing source to thereupon and at predetermined periodic intervals supply signals to said available power computer means and said priority means to cause said periodic operation thereof.

6. The apparatus in accordance with claim 5 additionally including:
monitoring means for monitoring the power consumption of each of said devices to determine the point in said pattern of each said device and responsive to said timing means for periodically supplying signals to said first and second power usage computer means for correcting said point-determining means.

7 The method of controlling total power consumption during a demand billing period of a plurality of controllable variable-rate power-consuming devices which operate in a known pattern, said devices including control means operable to separately control the power consumption rate of each said device and thereby stretch or shorten said pattern therefor, and wherein metering means supplies signals indicative of the power consumption of said devices, comprising the following series of steps, which series is initiated at predetermined intervals;

responding to said signals from said metering means and to a preset limit of the amount of power consumption for said demand billing period to compute by an instrumentality the amount of remaining power available for consumption by said devices during the remainder of said demand billing period;

allocating priorities between said devices in accordance with a predetermined classification;

based upon an estimate of the present point in said pattern of the operation of said devices having the highest priority allocated thereto, computing by an instrumentality an estimate of the power consumption thereof as defined by said pattern for the remainder of the the demand billing period;

signalling by an instrumentality said control means for said highest priority devices to operate said associated device at the maximum available power consumption rate in accordance with said pattern:

subtracting by an instrumentality the value of said estimated power consumption from the value of said remaining available power to thereby determine the amount of power available for the remaining ones of said devices;

based upon an estimate of the present point in said pattern of operation of said devices not having the highest priority allocated thereto, computing by an instrumentality an estimate of the maximum amount of power consumption thereof as defined by said pattern for the remainder of the demand billing period;

computing by an instrumentality the ratio between the value of said amount of power available for said remaining devices and the value of said estimated maximum amount of power consumption thereby and signalling by an instrumentality said control means for said remaining devices to operate said associated device at a power consumption rate in accordance with said ration as related to the maximum rate of said pattern.

8. The method in accordance with claim 7 additionally including the steps of:
updating by an instrumentality said estimate of said point in said pattern of the operation of each said highest priority device in accordance with said pattern at said maximum power consumption rate thereof; and
updating by an instrumentality said estimate of said point in said pattern of the operation of each said remaining device in accordance with said pattern at the power consumption ratio thereof in accordance with said ratio.

9. The method in accordance with claim 8 wherein said steps of computing estimates of the power consumption of said devices each comprise the steps of:
based upon said updated estimate of the present point in said pattern of the operation of each of said associated devices, computing by an instrumentality an estimate of the power consumption rates and time to be spent at each such rate for each said device during the remainder of said demand billing period; and
computing by an instrumentality from the values of said estimated rates and times an estimate of the maximum total power consumption of said associated devices during the remainder of the demand billing period.

10. The method in accordance with claim 9 wherein said step of computing an estimate of the maximum total power consumption of said associated devices comprises the steps of:
multiplying by an instrumentality the value of each said estimated power consumption rate for each associated device by the value of said estimated time to be spent thereby at such rate; and
adding by an instrumentality the products of said multiplication.

11. The method in accordance with claim 9 including the additional step of:
monitoring by an instrumentality the power consumption of each of said devices to determine the point in said pattern of each said device; and
correcting by an instrumentality said estimates of said point in pattern of each said device in accordance with said determination thereof.